(12) United States Patent
Laughlin

(10) Patent No.: US 6,243,511 B1
(45) Date of Patent: Jun. 5, 2001

(54) SYSTEM AND METHOD FOR DETERMINING THE CONDITION OF AN OPTICAL SIGNAL

(75) Inventor: Richard H. Laughlin, Richardson, TX (US)

(73) Assignee: Optical Switch Corporation, Richardson, TX (US)

( * ) Notice: Subject to any disclaimer, the term of this patent is extended or adjusted under 35 U.S.C. 154(b) by 0 days.

(21) Appl. No.: 09/244,570

(22) Filed: Feb. 4, 1999

(51) Int. Cl.$^7$ ....................................................... G02B 6/26
(52) U.S. Cl. ............................... 385/18; 385/15; 356/128; 356/136
(58) Field of Search ................................. 356/128, 133, 356/135, 136, 445; 385/12, 16, 18, 33, 36

(56) References Cited

U.S. PATENT DOCUMENTS

| Re. 29,194 | 4/1977 | Ambrose et al. .................. 355/43 |
| 1,967,548 | 7/1934 | Bartels ................................ 240/1 |

(List continued on next page.)

FOREIGN PATENT DOCUMENTS

| 281664A5 | 8/1990 | (DE) . |
| 0347563A2 | 12/1989 | (EP) . |
| 0558025A1 | 2/1993 | (EP) . |
| 1215209 | 10/1970 | (GB) . |
| 61-232412 | 10/1986 | (JP) . |

OTHER PUBLICATIONS

U.S. Patent Application Ser. No. 09/111,455, entitled, "Method and Apparatus for Aligning Optical Fibers," filed Jul. 8, 1998.

U.S. Patent Application Ser. No. 09/111,570, entitled, "Method and Apparatus for Connecting Optical Fibers," filed Jul. 8, 1998.

U.S. Patent Application Ser. No. 09/111,571, entitled, "Method and Apparatus for Aligning Optical Fibers Using an Alignment Spacer," filed Jul. 8, 1998.

U.S. Patent Application Ser. No. 09/212,616, entitled, "Frustrated Total Internal Reflection Bus and Method of Operation," filed Dec. 16, 1998.

U.S. Patent Application Ser. No. 09/415,506, entitled "Frustrated Total Internal Reflection Switch Using Double Pass Reflection and Method of Operation," filed Oct. 8, 1999.

U.S. Patent Application Ser. No. 09/483,742, entitled "System and Method for Beam–Steering using a Reference Signal Feedback," filed Jan. 17, 2000.

Court, et al., "Frustrated Total Internal Reflection and Application of Its Principle to Laser Cavity Design," Jun. 1964/ vol. 3, No. 6/Applied Optics pp. 719–726.

Dale Murray, et al., "Scalable Optical Switch Using Rotating Refractive Plates," *AMP Incorporated*, 10 pages, presented at the National Fiber Optics Engineers Conference, Sep., 1998.

(List continued on next page.)

*Primary Examiner*—James Phan
(74) *Attorney, Agent, or Firm*—Baker Botts L. L. P.

(57) ABSTRACT

A system for determining the condition of an optical signal includes a first refractive material having an interface with a second refractive material. The first refractive material receives an optical signal. A portion of the optical signal reflects off the interface between the first refractive material and the second refractive material as a reflection signal. A signal monitoring circuit determines the condition of the optical signal using the reflection of the optical signal at the interface between the first refractive material and the second refractive material.

41 Claims, 3 Drawing Sheets

U.S. PATENT DOCUMENTS

| | | |
|---|---|---|
| 2,565,514 | 8/1951 | Pajes . |
| 2,997,922 | 8/1961 | Kaprelian . |
| 3,338,656 | 8/1967 | Asthelmer . |
| 3,376,092 | 4/1968 | Kushner et al. . |
| 3,514,183 | 5/1970 | Rabedeau . |
| 3,520,595 | 7/1970 | Treuthart . |
| 3,559,101 | 1/1971 | Parker et al. ............... 332/7.51 |
| 3,649,105 | 3/1972 | Treuthart . |
| 3,666,358 | 5/1972 | Banks ........................... 353/25 |
| 3,719,411 | 3/1973 | Midwinter ..................... 350/96 |
| 3,770,347 | 11/1973 | Ambrose et al. ............... 355/43 |
| 3,980,395 | 9/1976 | Giallorenzi et al. . |
| 4,026,638 | 5/1977 | Govignon ........................ 351/7 |
| 4,121,884 | 10/1978 | Greenwood . |
| 4,135,791 | 1/1979 | Govignon ........................ 351/7 |
| 4,165,155 | 8/1979 | Gordon, II et al. . |
| 4,244,045 | 1/1981 | Nosu et al. ...................... 370/3 |
| 4,249,814 | 2/1981 | Hull et al. ..................... 354/154 |
| 4,278,327 | 7/1981 | McMahon et al. . |
| 4,303,302 | 12/1981 | Ramsey et al. . |
| 4,355,864 | 10/1982 | Soref . |
| 4,361,911 | 11/1982 | Buser et al. .................... 455/605 |
| 4,385,799 | 5/1983 | Soref . |
| 4,452,506 | 6/1984 | Reeve et al. . |
| 4,456,329 | 6/1984 | Henderson et al. . |
| 4,474,424 | 10/1984 | Wagner . |
| 4,482,994 | 11/1984 | Ishikawa ......................... 370/3 |
| 4,498,730 | 2/1985 | Tanaka et al. . |
| 4,504,121 | 3/1985 | Carlsen et al. . |
| 4,521,069 | 6/1985 | Ikeda . |
| 4,613,203 | 9/1986 | Proetel et al. . |
| 4,626,066 | 12/1986 | Levinson . |
| 4,634,239 | 1/1987 | Buhrer . |
| 4,657,339 | 4/1987 | Fick . |
| 4,696,062 | 9/1987 | LaBudde ........................ 455/612 |
| 4,714,326 | 12/1987 | Usui et al. . |
| 4,738,500 | 4/1988 | Grupp et al. . |
| 4,746,179 | 5/1988 | Dahne et al. . |
| 4,789,215 | 12/1988 | Anderson et al. . |
| 4,790,621 | 12/1988 | Calaby et al. . |
| 4,796,263 | 1/1989 | Rampolla ....................... 372/10 |
| 4,814,600 | 3/1989 | Bergström ..................... 250/221 |
| 4,838,637 | 6/1989 | Torok et al. . |
| 4,927,225 | 5/1990 | Levinson . |
| 5,000,534 | 3/1991 | Watanabe et al. . |
| 5,026,138 | 6/1991 | Boudreau et al. . |
| 5,031,987 | 7/1991 | Norling . |
| 5,046,832 | 9/1991 | Bell ............................... 359/305 |
| 5,064,263 | 11/1991 | Stein .............................. 385/14 |
| 5,101,460 | 3/1992 | Richard .......................... 385/37 |
| 5,111,323 | 5/1992 | Tanaka et al. ................. 359/139 |
| 5,163,105 | 11/1992 | Knoll et al. .................... 385/44 |
| 5,199,088 | 3/1993 | Magel ............................. 385/18 |
| 5,204,922 | 4/1993 | Weir et al. ..................... 385/18 |
| 5,206,920 | 4/1993 | Cremer et al. ................. 385/37 |
| 5,208,880 | 5/1993 | Riza et al. ...................... 385/18 |
| 5,221,987 | 6/1993 | Laughlin ........................ 359/222 |
| 5,225,887 | 7/1993 | Lipson et al. .................. 356/345 |
| 5,227,911 | 7/1993 | Schiller et al. ................. 359/222 |
| 5,309,455 | 5/1994 | Adachi et al. ................... 372/25 |
| 5,323,224 | 6/1994 | Wada ............................. 356/73.1 |
| 5,323,477 | 6/1994 | Lebby et al. ................... 385/129 |
| 5,335,300 | 8/1994 | Hartman et al. ................ 385/37 |
| 5,343,286 | 8/1994 | Keeble et al. .................. 356/73.1 |
| 5,343,541 | 8/1994 | Uken et al. ..................... 385/16 |
| 5,343,546 | 8/1994 | Cronin et al. .................. 385/52 |
| 5,361,315 | 11/1994 | Lewis et al. .................... 385/16 |
| 5,369,718 | 11/1994 | Kamata et al. ................. 385/21 |
| 5,379,142 | 1/1995 | Handa ............................ 359/129 |
| 5,396,325 | * 3/1995 | Carome et al. ................. 356/133 |
| 5,420,947 | 5/1995 | Li et al. .......................... 385/37 |
| 5,436,986 | 7/1995 | Tsai ................................ 385/16 |
| 5,436,991 | 7/1995 | Sunagawa et al. ............. 385/37 |
| 5,442,435 | * 8/1995 | Cooper et al. .................. 356/133 |
| 5,444,801 | 8/1995 | Laughlin ........................ 385/16 |
| 5,457,760 | 10/1995 | Mizrahi .......................... 385/37 |
| 5,479,543 | 12/1995 | Black ............................. 385/31 |
| 5,521,733 | 5/1996 | Akiyama et al. .............. 359/127 |
| 5,553,175 | 9/1996 | Laughlin ........................ 385/16 |
| 5,555,327 | 9/1996 | Laughlin ........................ 385/16 |
| 5,555,558 | 9/1996 | Laughlin ........................ 385/16 |
| 5,561,541 | 10/1996 | Sharp et al. .................... 359/66 |
| 5,566,260 | 10/1996 | Laughlin ........................ 385/16 |
| 5,583,683 | 12/1996 | Scobey ........................... 359/127 |
| 5,590,227 | 12/1996 | Osaka et al. ................... 385/53 |
| 5,594,578 | 1/1997 | Ainslie et al. .................. 359/127 |
| 5,621,829 | 4/1997 | Ford ............................... 385/22 |
| 5,627,925 | 5/1997 | Alferness et al. .............. 385/17 |
| 5,640,479 | 6/1997 | Hegg et al. ..................... 385/120 |
| 5,647,033 | 7/1997 | Laughlin ........................ 385/16 |
| 5,652,816 | 7/1997 | Minami et al. ................. 385/31 |
| 5,664,034 | 9/1997 | Mock .............................. 385/16 |
| 5,699,462 | 12/1997 | Fouquet et al. ................ 385/18 |
| 5,727,099 | 3/1998 | Harman .......................... 385/52 |
| 5,732,168 | 3/1998 | Donald ........................... 385/16 |
| 5,748,812 | 5/1998 | Buchin ........................... 385/18 |
| 5,774,604 | 6/1998 | McDonald ..................... 385/18 |
| 5,828,799 | 10/1998 | Donald ........................... 385/16 |
| 5,841,916 | 11/1998 | Laughlin ........................ 385/16 |
| 5,875,271 | 2/1999 | Laughlin ........................ 385/16 |
| 5,892,863 | 4/1999 | Presby ............................ 385/16 |
| 5,909,301 | 6/1999 | Laughlin ........................ 359/222 |
| 5,917,641 | 6/1999 | Laughlin ........................ 359/222 |

OTHER PUBLICATIONS

Katsuhiko Hirabayashi Tsuyoshi Yamamoto, and Shigeki Hino; "Optical backplane with free–space optical interconnections using tunable beam deflectors and a mirror for bookshelf–assembled terebit per second class asynchronous transfer mode switch"; 1998 Society of Photo–Optical Instrumentation Engineers; all (No month).
95921362; Dec. 9, 1997; Supplementary European Search Report; all.
Bellcore; Technical Reference TR–NWT–001073; "Generic Requirements for Fiber Optic Switches"; Jan. 1994; all.
"SELFOC® Product Guide," *NSG America, Inc.*, Dec., 1996, 26 pages.
Steffen Glockner, Rolf Goring, Bernt Gotz and Andreas Rose; "Piezoelectrically driven micro–optic fiber switches", Optical Engineering, vol. No. 4, Apr. 1988; all.

* cited by examiner-

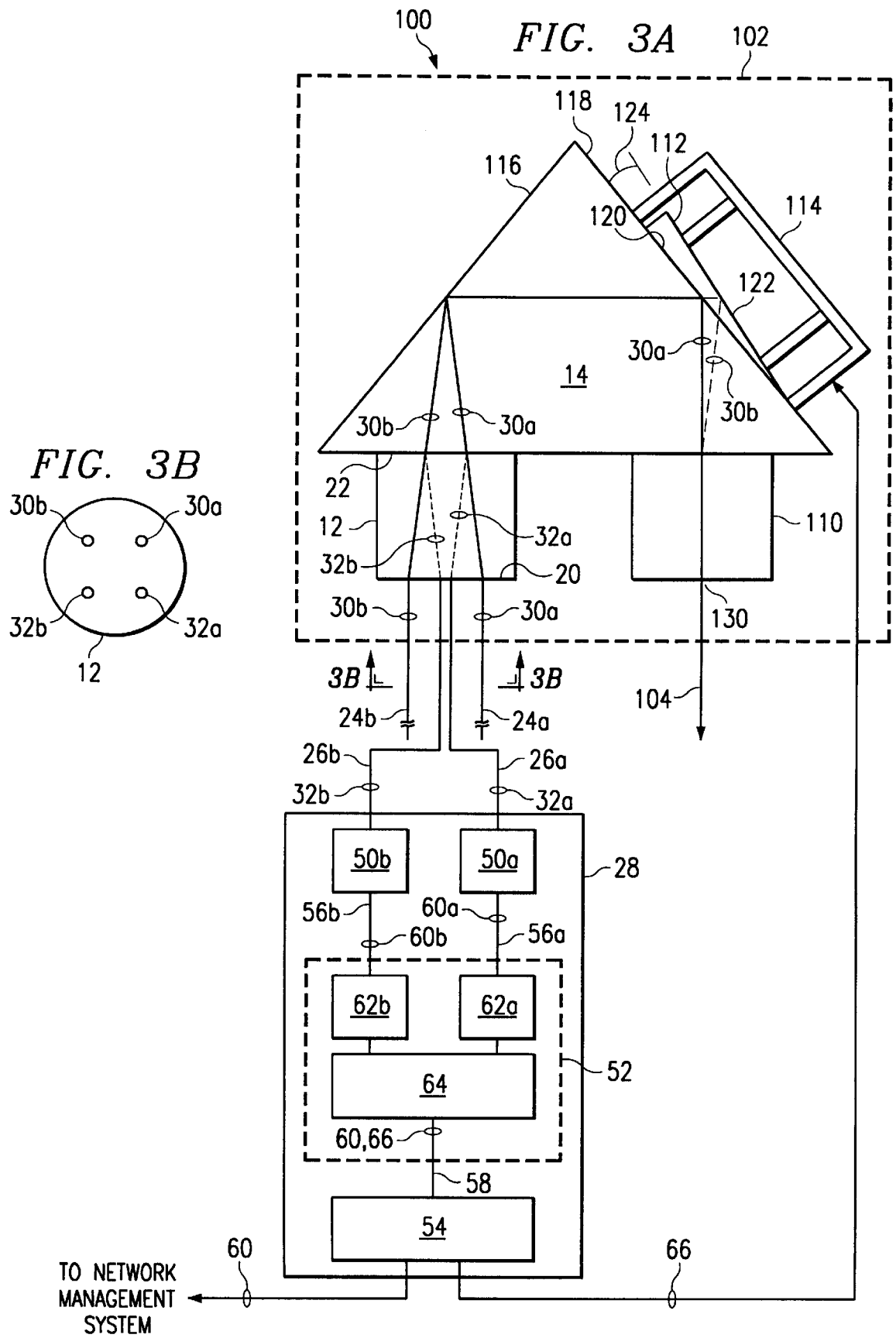

SYSTEM AND METHOD FOR DETERMINING THE CONDITION OF AN OPTICAL SIGNAL

TECHNICAL FIELD OF THE INVENTION

This invention relates to the field of optical devices and more particularly to a system and method for determining the condition of an optical signal.

BACKGROUND OF THE INVENTION

Optical signal loss may occur in a long length of an optical fiber or at an interface between two optical devices, such as at a connection between an optical fiber and another optical device. The condition of the optical signal communicated by the optical fiber to an optical device is important to the proper operation of the optical device. For example, if the optical signal is absent, attenuated, or otherwise degraded, the optical device may malfunction. Several techniques attempt to detect these conditions and provide protection switching to maintain communication.

One approach described in BellCore Technical Reference No. TR-NWT-001073 resolves this problem by splitting the optical signal into a primary component and a secondary component, and sampling the secondary component of the optical signal to determine the condition of the optical signal prior to communicating the optical signal to the optical device. This approach attenuates the optical signal by at least the amount of the secondary component and may create additional insertion losses in the optical signal.

SUMMARY OF THE INVENTION

In accordance with the present invention, a system and method for determining the condition of an optical signal is provided that substantially eliminates or reduces disadvantages and problems associated with previous techniques.

In accordance with one embodiment of the present invention, a system for determining the condition of an optical signal includes a first refractive material that receives an optical signal, and that has an interface with a second refractive material. The system further includes a signal monitoring circuit that determines the condition of the optical signal in response to a reflection generated at the interface by the optical signal.

Another embodiment of the present invention is a method for determining the condition of an optical signal that includes communicating an optical signal through a first refractive material having an interface with a second refractive material. The method continues by detecting a reflection generated at the interface by the optical signal. The method concludes by determining the condition of the optical signal in response to the reflection.

Yet another embodiment of the present invention is an optical apparatus that includes a first refractive material that receives a first optical signal and a second optical signal. The first refractive material has an interface with a second refractive material. The optical apparatus further includes a signal monitoring circuit that generates a control signal in response to a reflection generated at the interface by the first optical signal. A switchplate coupled to the second refractive material has a first position and a second position. An actuator coupled to the switchplate places the switchplate in a selected one of the first position and the second position in response to the control signal.

Technical advantages of the present invention include a signal monitoring circuit that determines the condition of an optical signal in response to a reflection generated by the optical signal at an interface between a first refractive material and a second refractive material. Prior attempts to sample an optical signal required splitting the signal into a primary component and a secondary component. This technique attenuates the optical signal by at least the amount of the secondary component that is split off for sampling and may create additional insertion losses in the optical signal. By determining the integrity of and, in one embodiment, the data communicated by the optical signal based upon a reflection signal generated by the optical signal at an interface between a first refractive material and a second refractive material, the present invention reduces the attenuation of the optical signal in comparison with prior techniques. In a particular embodiment, the reduction in attenuation may range from 1 dB to 6 dB.

Another important advantage of the present invention is an optical apparatus that includes the signal monitoring circuit and an optical device, such as an optical switch, to provide protection switching from a primary signal to a protection signal. The signal monitoring circuit controls locally the operation of the optical switch based upon a reflection generated by the primary signal at an interface between a first refractive material and a second refractive material associated with the optical switch. Prior attempts to provide protection switching using an optical switch include a centralized network management system in an optical network that receives information regarding the primary signal and centrally processes the information to control the protection switching. This technique requires substantial propagation time to receive and process data regarding the primary signal, to determine whether or not to activate the optical switch, and to communicate an appropriate control signal to the optical switch. In particular, the propagation times required by this technique often exceed switching tolerances permitted by the optical network. By processing the reflections generated by a primary signal at the optical switch using the signal monitoring circuit, the present invention controls the operation of the optical switch locally to provide protection switching. Accordingly, the present invention reduces the protection switching time of the optical switch. In one embodiment, the protection switching time of an optical switch using the present invention is reduced to less than ten microseconds, which may prevent detection and reporting of a fault in an optical network. Other technical advantages of the present invention are evident to one skilled in the art from the attached description, figures, and claims.

BRIEF DESCRIPTION OF THE DRAWINGS

For a more complete understanding of the present invention and its advantages, reference is now made to the following description taken in conjunction with the accompanying figures in which like reference numbers indicate like features and wherein:

FIG. 3A illustrates another embodiment of an apparatus for switching optical signals using the system; and FIG. 3B illustrates a cross-sectional view of a portion of the apparatus for switching optical signals taken along line 3B—3B of FIG. 3A.

DETAILED DESCRIPTION OF THE INVENTION

Figure 1:
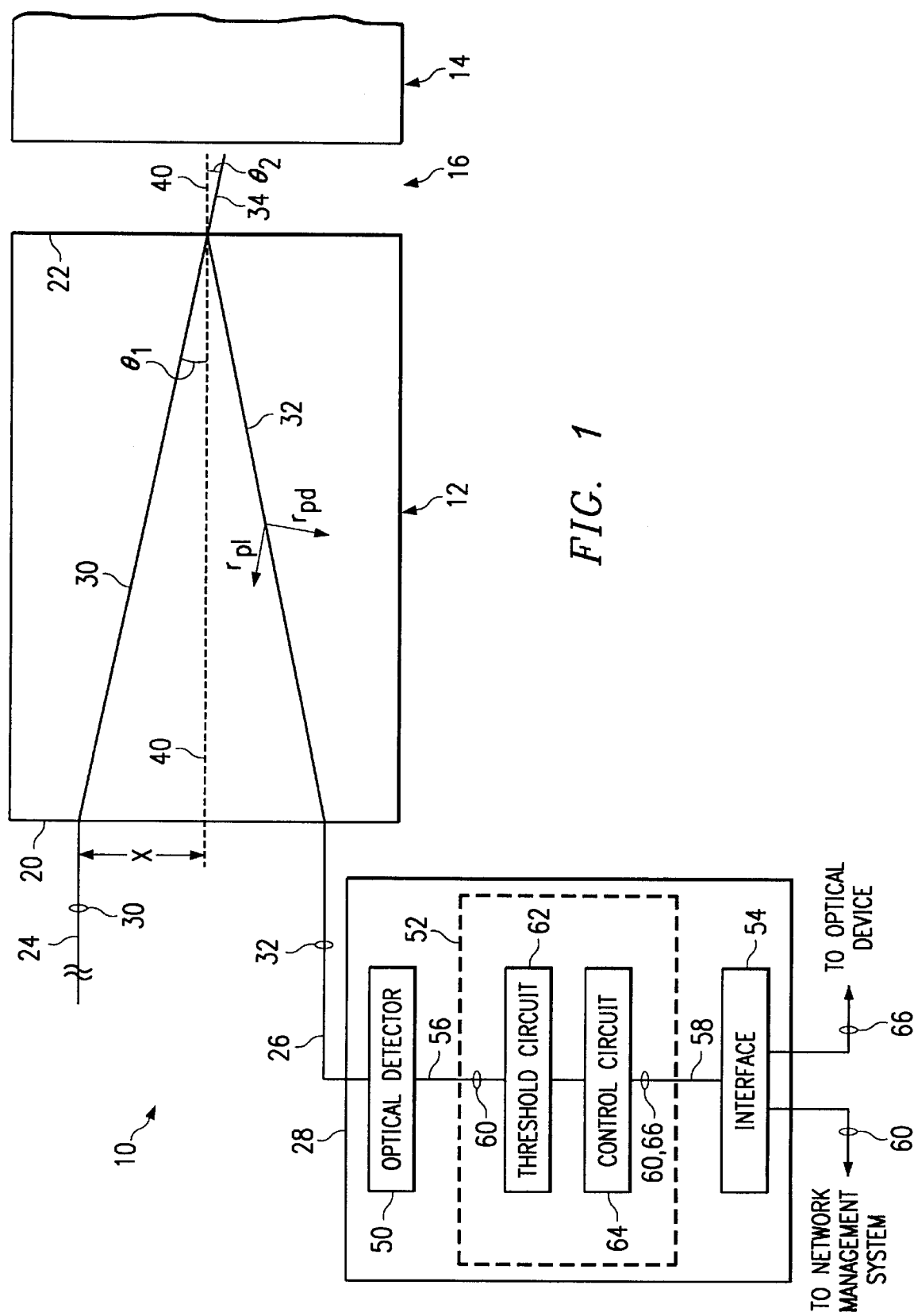
FIG. 1 illustrates a system for determining the condition of an optical signal in accordance with the teachings of the present invention.

FIG. 1 illustrates a system 10 for determining the condition of an optical signal that includes a first refractive material 12, a second refractive material 14, and, in one embodiment, a third refractive material 16 disposed between materials 12 and 14. Material 12 has a first face 20 and a second face 22 that defines an interface between materials 12 and 16. An optical fiber 24 couples to first refractive material 12 along first face 20. A signal monitoring circuit 28 couples to first refractive material 12 using, in one embodiment, an optical fiber 26.

In general, optical fiber 24 communicates an optical signal 30 to second face 22 of first refractive material 12. A portion of signal 30 reflects off the interface between materials 12 and 16, and propagates back toward first face 20 as a reflection signal 32, such as a Fresnel reflection. The optical energy caused by the Fresnel reflection of signal 30 at the interfaces between materials 12, 14, and 16 is generally referred to as reflection signal 32. The data communicated by reflection signal 32 comprises the same data communicated by optical signal 30. The remaining portion of optical signal 30 propagates through the interface between materials 12 and 16 at an angle according to Snell's law. Signal monitoring circuit 28 receives reflection signal 32 using, in one embodiment, optical fiber 26. Signal monitoring circuit signal 28 determines the condition of optical signal 30 within materials 12, 14, and 16 using reflection signal 32. For example, signal monitoring circuit 28 may determine the absence, attenuation, or other degradation of signal 30, as well as the data content of signal 30, based on reflection signal 32.

Refractive materials 12 and 14 comprise a lens, such as a gradient index (GRIN) lens, a rhomboid, a prism, or any other suitable configuration of optically transmissive material, such as glass. Each of refractive materials 12 and 14 may be selected to provide a particular index of refraction, $n_{12}$ and $n_{14}$, respectively, at a particular wavelength of optical signal 30. Although the following description is detailed with reference to material 12 and material 14 comprising a lens and a rhomboid, respectively, any combination of materials 12 and material 14 may comprise a lens, a rhomboid, an optical switch, a transmitter, a receiver, or any other suitable optical device. Material 12 may be placed in proximal contact with or spaced apart from material 14. If material 12 is spaced apart from material 14, then a third refractive material 16 is disposed between materials 12 and 14. Third refractive material 16 comprises air, an epoxy layer, and/or any other suitable material or combination of materials that has an index of refraction, $n_{16}$. For example, material 16 may comprise an epoxy layer that binds materials 12 and 14.

Optical fiber 24 couples to first refractive material 12 along first face 20. In one embodiment, optical fiber 24 couples to first face 20 displaced from an incidence axis 40 of material 12 by a distance X. Fiber 24 supports full duplex transmission of optical signal 30. For example, fiber 24 may transmit and receive optical signal 30. Optical fiber 26 couples to first face 20 of material 12 at a position in response to the distance X between fiber 24 and axis 40; the angle of reflection, $\theta_1$, of signal 30; and/or the effective focal length of refractive material 12.

Signal monitoring circuit 28 comprises an appropriate combination and arrangement of optical, electrical, mechanical, or thermal devices that detect and process reflection signal 32 to determine the condition of optical signal 30. Although circuit 28 is illustrated coupled to material 12 by fiber 26, signal monitoring circuit 28 may couple directly to material 12 to receive reflection signal 32. In general, signal monitoring circuit 28 determines the condition of optical signal 30 within materials 12, 14, and 16 using reflection signal 32. In particular, circuit 28 determines the absence, attenuation, or other degradation of optical signal 30 (referred to generally as the condition of optical signal 30) based upon the magnitude of reflection signal 32. In one embodiment, as described in greater detail below with reference to FIG. 2, signal monitoring circuit 28 generates a control signal that controls an optical switch in response to the condition of signal 30.

Signal monitoring circuit 28 includes an optical detector 50, a signal processing circuit 52 coupled to optical detector 50 using link 56, and an interface 54 coupled to signal processing circuit 52 using link 58. Optical detector 50 comprises a photodetector or any other suitable transducer that converts reflection signal 32 into monitoring signal 60 having an electrical or otherwise suitable format. In one embodiment, signal 60 is proportional to the power of reflection signal 32. Signal 60 generated by optical detector 50 may also contain in an appropriate format the data communicated by reflection signal 32 and, accordingly, the data communicated by optical signal 30.

Signal processing circuit 52 includes any number and arrangement of processing and memory devices to receive, amplify, condition, encode, modulate or otherwise process signal 60 using a variety of processing techniques. In a particular embodiment, signal processing circuit 52 includes a threshold circuit 62 and a control circuit 64 in any number and arrangement of components. Threshold circuit 62 may comprise a resistor string, transistors, comparators, logic gates, or any suitable combination of analog or digital devices that receive monitoring signal 60 associated with reflection signal 32 and compare it with a threshold range defined by a lower threshold and an upper threshold. The threshold range defined by threshold circuit 62 is predetermined to measure the condition of optical signal 30. In particular, the lower and upper thresholds of the threshold range may be selected based upon an expected range of values of signal 30; the index of refraction of materials 12, 14, and 16; the distance X between fiber 24 and incidence axis 40 of material 12; the angle of reflection, $\theta_1$, of signal 30; and/or other characteristics of system 10.

In one embodiment, if monitoring signal 60 comprises an electrical signal, then the thresholds comprise lower and upper voltage thresholds. In this embodiment, if electrical signal 60 is greater than the lower voltage threshold and is less than the upper voltage threshold, threshold circuit 62 determines that optical signal 30 propagating within materials 12, 14 or 16 is present and robust. If signal 60 is less than the lower voltage threshold, threshold circuit 62 determines that optical signal 30 propagating within materials 12, 14, or 16 is attenuated or absent. If signal 60 is greater than the upper voltage threshold, threshold circuit 62 determines that optical signal 30 propagating within materials 14 or 16 may be attenuated due to a substantial reflection at interface 22. This substantial reflection may evidence a faulty connection or coupling of materials 12 and 14.

Control circuit 64 comprises suitable analog or digital processing and memory devices that generate a control signal 66 in response to the magnitude of reflection signal 32 in comparison with the lower and upper thresholds as determined by threshold circuit 62. In one embodiment, control signal 66 instructs an optical switch to toggle between optical signal 30 and an associated protection signal based upon the condition of signal 30 as determined by threshold circuit 62.

Interface 54 performs multiplexing or demultiplexing functions, data coding or decoding functions, protocol conversions, device or network interfacing, or any other appropriate processing to communicate monitoring signal 60, control signal 66, or any other information between signal monitoring circuit 28 and any other component of system 10. System 10 supports the transmission of any format of information whether originally in an optical, electrical, or other suitable format.

In one embodiment, system 10 comprises one component of an optical network, such as a synchronous optical network (SONET), that includes a network management system. In this embodiment, interface 54 may communicate to the management system of the optical network a portion of the data from signal 30, monitoring signal 60, control signal 66, network system alarms, or any other suitable network management information for further processing. Prior attempts to communicate the data of optical signal 30 to the network management system of a SONET require splitting optical signal 30 into a primary component and a secondary component. This prior art technique attenuates the optical signal by at least the amount of the secondary component. By determining the data of optical signal 30 using reflection signal 32 rather than a component of signal 30, the present invention reduces the attenuation of optical signal 30 in comparison with prior data communication techniques.

Optical signal 30 comprises visible light, infrared radiation, ultraviolet radiation, or any other suitable collimated or de-collimated optical signal. Reflection signal 32 comprises the optical energy resulting from a reflection of a portion of optical signal 30, such as a Fresnel reflection, that results when optical signal 30 strikes second face 22 that defines an interface between materials 12 and 16 having dissimilar refractive indices. Reflection signal 32 includes a component perpendicular to optical signal 30, $r_{pd}$, and a component parallel to optical signal 30, $r_{pl}$. The magnitude of reflection signal 32 may be modeled by the following Fresnel equations:

$$r_{pd} = 10 \cdot \log\left[\frac{(\sin(\theta_1 - \theta_2))^2}{(\sin(\theta_1 + \theta_2))^2}\right]$$

$$r_{pl} = 10 \cdot \log\left[\frac{(\tan(\theta_1 - \theta_2))^2}{(\tan(\theta_1 + \theta_2))^2}\right]$$

where:

$\theta_1$ = angle of incidence of signal 30;

$\theta_2 = a\sin\left(\frac{n_{12} \cdot \sin(\theta_1)}{n_{16}}\right)$ $n_{12}$ = index of refraction of first refractive material 12;

$n_{16}$ = index of refraction of third refractive material 16;

Reflection signal 32 is modeled above with reference to the interface between materials 12 and 16 for illustrative purposes only and it should be understood that reflection signal 32 may also include a perpendicular reflection component and a parallel reflection component generated at other interfaces, such as the interface between materials 16 and 14, or the interface between materials 12 and 14 if material 12 is placed in proximal contact with material 14. In a particular embodiment, each interface reflects approximately four to six percent of optical signal 30 as reflection signal 32.

In operation, optical fiber 24 communicates optical signal 30 to second face 22 of first refractive material 12 at an angle of reflection, $\theta_1$, with respect to incidence axis 40 of material 12. Incidence axis 40 comprises an imaginary line that is normal to second face 22 of material 12. A portion of optical signal 30 reflects off second face 22 as reflection signal 32. According to Snell's law, the remaining portion of optical signal 30 propagates through second face 22 at an angle, $\theta_2$, with respect to incidence axis 40. Although the description of FIG. 1 is detailed with reference to monitoring a single reflection signal 32 to determine the condition of an associated optical signal 30, the present invention may determine the condition of any number of optical signals 30 based upon their associated reflection signals 32.

Signal monitoring circuit 28 receives reflection signal 32 using, in one embodiment, optical fiber 26. Optical detector 50 of circuit 28 converts reflection signal 32 into monitoring signal 60 proportional to the power of reflection signal 32. Threshold circuit 62 of signal monitoring circuit 28 receives signal 60 and compares it with a predetermined threshold range to determine the condition of optical signal 30 within materials 12, 14, and 16.

In a particular embodiment, if the voltage magnitude of signal 60 is greater than a predetermined lower voltage threshold and is less than a predetermined upper voltage threshold, circuit 62 determines that optical signal 30 is present and robust. If the voltage magnitude of signal 60 is less than the lower voltage threshold, circuit 62 determines that optical signal 30 propagating within material 12, 14, or 16 is absent or attenuated. For example, the interface between material 12 and materials 14 and 16 will generate little or no optical energy as a result of a Fresnel reflection of optical signal 30 if signal 30 is absent or attenuated. If the voltage magnitude of signal 60 is greater than the upper voltage threshold, circuit 62 determines that optical signal 30 propagating within materials 14 or 16 is attenuated. For example, the interface between material 12 and materials 14 and/or 16 may generate increased levels of optical energy due to Fresnel reflections of optical signal 30 due to an improper connection or excessive residue at an interface, or other reasons, thereby attenuating beyond acceptable levels optical signal 30 propagating through the interface and within materials 14 and 16.

As described below with reference to FIGS. 2 and 3, a control circuit 64 coupled to threshold circuit 62 may generate a control signal 66 based upon the condition of signal 30 to control the operation of an optical device, such as an optical switch. For example, if optical signal 30 is absent, attenuated, or otherwise degraded as determined by threshold circuit 62, control circuit 64 generates a control signal 66 that instructs the optical switch to toggle from optical signal 30 to an associated protection signal. If optical signal 30 is present and robust as determined by threshold circuit 62, control circuit 64 may not generate a control signal 66 so that the optical switch remains in its current switched state. Alternatively, if optical signal 30 is present and robust, control circuit 64 may generate a control signal 66 that instructs the optical switch to toggle from the protection signal to optical signal 30.

An important advantage of the present invention is the ability to determine the condition of optical signal 30 based upon reflection signal 32. Prior attempts to sample optical signal 30 require splitting optical signal 30 into a primary component and a secondary component for processing. This technique attenuates optical signal 30 by at least the amount of the secondary component and may introduce other insertion losses into signal 30. By determining the condition of and the data communicated by optical signal 30 based upon reflection signal 32, the present invention reduces the attenuation of optical signal 30 in comparison to prior techniques.

In a particular embodiment, the reduction in attenuation may range from 1 dB to 6 dB.

As described in greater detail below with reference to FIGS. 2 and 3, another important advantage of the present invention is the ability to provide protection switching from a primary signal, such as signal 30, to a protection signal by locally controlling the operation of an optical switch based upon the condition of signal 30 as indicated by reflection signal 32. Prior attempts to provide protection switching using an optical switch include a centralized network management system in an optical network that receives information regarding the primary signal and centrally processes the information to control the protection switching. The propagation time required by a network management system to receive data regarding the primary signal, to process the data, to determine whether or not to activate the optical switch, and to communicate an appropriate control signal to the optical switch, often exceeds the time set by optical network standards to recover from a faulty or lost signal. By processing optical signal 30 locally using signal monitoring circuit 28, the present invention reduces the time to switch from an optical signal 30 to a protection signal. In one embodiment, the switching time of the present invention is reduced to less than ten microseconds, which may prevent detection and reporting of a fault in an optical network.

Figure 2:
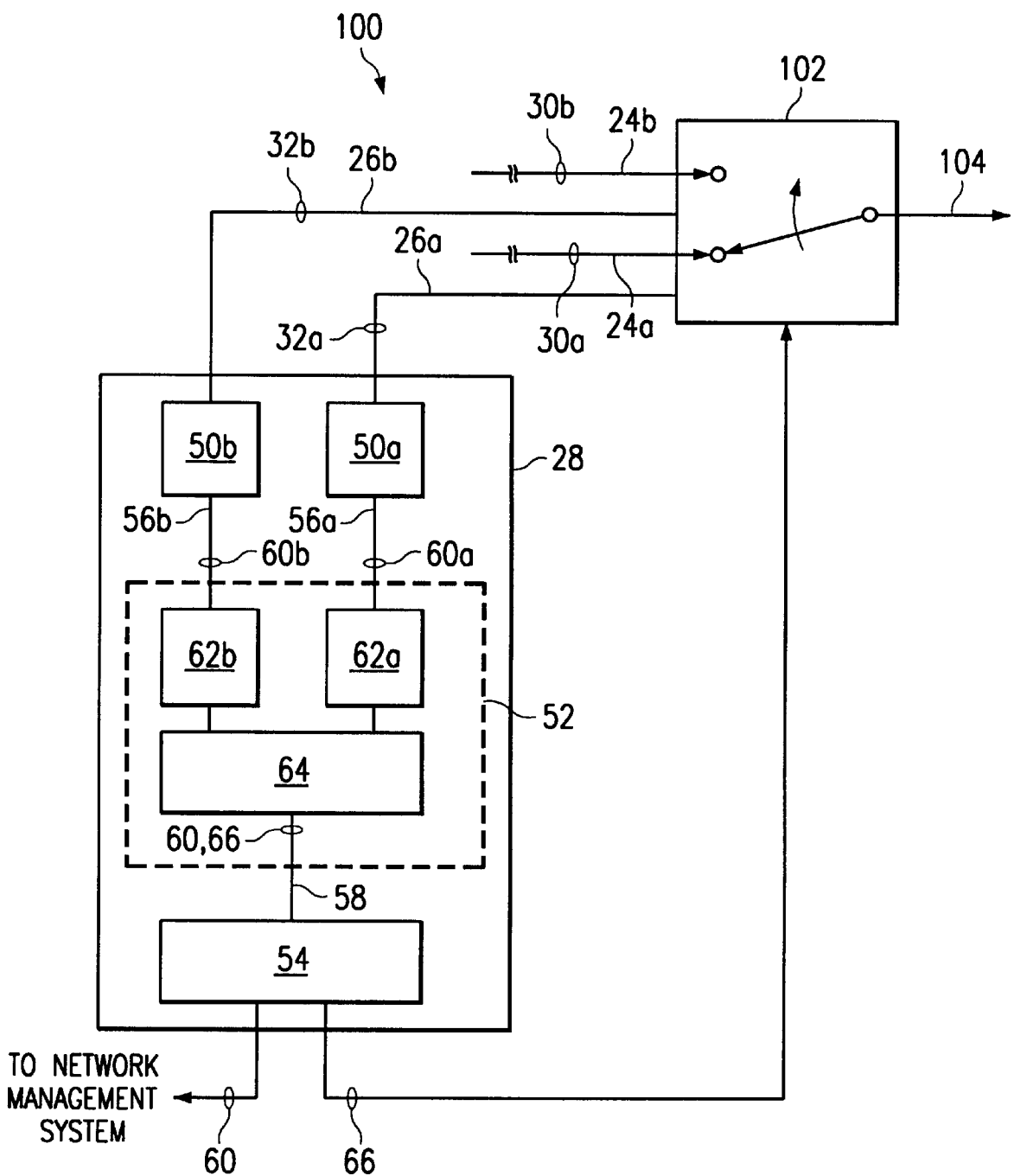
FIG. 2 illustrates one embodiment of an apparatus for switching optical signals using the system.

FIG. 2 illustrates one embodiment of an apparatus 100 that includes an optical switch 102 that receives a primary signal 30a using fiber 24a, a protection signal 30b using fiber 24b, and a control signal 66. Apparatus 100 further includes signal monitoring circuit 28 that receives a primary reflection 32a associated with primary signal 30a and a protection reflection 32b associated with protection signal 30b, and generates control signal 66. In general, signal monitoring circuit 28 determines the condition of primary signal 30a and protection signal 30b based upon reflection signals 32a and 32b, respectively, and, in response, generates control signal 66. Optical switch 102 communicates a selected one of primary signal 30a or -protection signal 30b as an output signal 104 in response to control signal 66 communicated by signal monitoring circuit 28.

Signal monitoring circuit 28 of apparatus 100 includes an optical detector 50a that receives primary reflection signal 32a and an optical detector 50b that receives protection reflection signal 32b. Optical detectors 50a and 50b may comprise any number and arrangement of separate or integral components of circuit 28. Optical detectors 50a and 50b convert reflection signals 32a and 32b into monitoring signals 60a and 60b (referred to generally as signal 60), respectively. In one embodiment, signals 60a and 60b generated by optical detectors 50a and 50b contain in a suitable format a portion of the data communicated by reflection signals 32a and 32b, respectively. Accordingly, signals 60a and 60b contain a portion of the data communicated by optical signals 30a and 30b, respectively. Signal monitoring circuit 28 further includes signal processing circuit 52 coupled to optical detectors 50a and 50b using links 56a and 56b, and interface 54 coupled to signal processing circuit 52 using link 58.

In one embodiment, signal processing circuit 52 includes a threshold circuit 62a coupled to optical detector 50a and a threshold circuit 62b coupled to optical detector 50b. Threshold circuits 56a and 56b may comprise any number and arrangement of analog or digital components of circuit 52 to determine the condition of signals 30a and 30b, as described above with reference to FIG. 1. In particular, threshold circuit 62a compares signal 60a with a predetermined threshold range to determine whether primary signal 30a is absent, attenuated, or otherwise degraded. Threshold circuit 62b similarly determines whether protection signal 30b is absent, attenuated, or otherwise degraded. Signal processing circuit 52 further includes control circuit 64 coupled to threshold circuits 62a and 62b. Control circuit 64 includes suitable analog or digital processing and memory devices to generate control signal 66 based upon the condition of optical signals 30a and 30b as determined by threshold circuits 62a and 62b.

Optical switch 102 may comprise any suitable combination of optical, electrical, mechanical, and thermal devices that receive primary signal 30a and protection signal 30b and communicates a selected one of signals 30a or 30b as output signal 104 in response to control signal 66. U.S. Pat. No. 5,647,033 discloses a variety of techniques and components to construct optical switch 102 that may be used in apparatus 100, and are herein incorporated by reference. Although the description of optical switch 102 is detailed with reference to receiving two input optical signals 30a and 30b, and communicating one output optical signal 104, optical switch 102 may receive and communicate any number of input and output signals to perform enhanced switching and multiplexing functions.

In operation of apparatus 100, signal monitoring circuit 28 determines the condition of primary signal 30a and protection signal 30b based upon reflection signals 32a and 32b, respectively, and, in response, generates control signal 66. Optical switch 102 communicates a selected one of primary signal 30a or protection signal 30b as output signal 104 in response to control signal 66. In particular, optical switch 102 receives a primary signal 30a and a protection signal 30b. As described above with reference to FIG. 1, optical switch 102 reflects a portion of signals 30a and 30b as reflection signals 32a and 32b. Reflection signals 32a and 32b generated at optical switch 102 may comprise Fresnel reflections modeled by the Fresnel equations described above with reference to FIG. 1. Detectors 50a and 50b of signal monitoring circuit 28 receive and convert reflection signals 32a and 32b into monitoring signals 60a and 60b, respectively. Threshold circuit 62a coupled to optical detector 50a receives and compares signal 60a with a predetermined threshold range to determine whether primary signal 30a is absent, attenuated, or otherwise degraded. Threshold circuit 62b coupled to optical detector 50b similarly receives and compares signal 60b with a predetermined threshold range to determine whether protection signal 30b is absent, attenuated, or otherwise degraded.

If threshold circuit 62a determines that primary signal 30a is present and suitable for use with optical switch 102, control circuit 64 may or may not generate a control signal 66 depending upon the state of the optical switch. For example, if optical switch 102 currently communicates primary signal 30a as output signal 104, control circuit 64 may not generate control signal 66. If optical switch 102 currently communicates protection signal 30b as output signal 104, control circuit 64 may generate a control signal 66 that toggles optical switch 102 so that it communicates primary signal 30a as output signal 104.

If threshold circuit 62a determines that primary signal 30a is absent, attenuated, or otherwise degraded and threshold circuit 62b determines that protection signal 30b is present and suitable for use with optical switch 102, control circuit 64 generates a control signal 66 that instructs optical switch 102 to toggle from primary signal 30a to protection signal 30b such that protection signal 30b is communicated as output signal 104.

If threshold circuit 62a determines that primary signal 30a is absent, attenuated, or otherwise degraded, and threshold circuit 62b determines that protection signal 30b is also absent, attenuated, or otherwise degraded, control circuit 64 determines which of signals 30a or 30b is least degraded and generates a control signal 66 that instructs optical switch 102 to communicate the selected optical signal 30 as output signal 104. Interface 54 communicates the appropriate control signal 66 to optical switch 102.

In one embodiment, apparatus 100 comprises one component of an optical network that includes a network management system. In this embodiment, interface 54 may also communicate monitoring signals 60a and 60b (referred to generally as signal 60), control signal 66, and any other information from signal monitoring circuit 28 to the network management system. The network management system may store the current state of optical switch 102 as determined by control signal 66, or perform further processing on signals 60a and 60b.

An important advantage of the present invention embodied by apparatus 100 is the ability to provide protection switching from primary signal 30a to protection signal 30b by locally controlling the operation of optical switch 102 based upon the condition of signals 30a and 30b as indicated by reflection signals 32a and 32b. Prior attempts to provide protection switching using optical switch 102 include a centralized network management system of an optical network that receives and determines the relative condition of optical signals 30a and 30b and, in response, communicates a control signal to activate optical switch 102. This prior art technique requires significant propagation time which may exceed switching tolerances permitted by the optical network. In one embodiment, the switching time of optical switch 102 controlled locally by signal monitoring circuit 28 of the present invention is less than ten microseconds, which may prevent detection and reporting of a fault in an optical network.

FIG. 3A illustrates apparatus 100 that includes signal monitoring circuit 28 and a particular embodiment of optical switch 102 that receives primary signal 30a, protection signal 30b, and communicates one of signals 30a or 30b as output signal 104 in response to control signal 66. In this embodiment, optical switch 102 includes refractive material 14 coupled to refractive materials 12 and 110. Optical switch 102 further includes a switchplate 112 and an actuator 114 coupled to refractive material 14. In general, signal monitoring circuit 28 determines the condition of primary signal 30a and protection signal 30b based upon reflection signals 32a and 32b, respectively, and, in response, generates control signal 66. Optical switch 102 communicates a selected one of primary signal 30a or protection signal 30b as output signal 104 by placing switchplate 112 into or out of proximal contact with refractive material 14 in response to control signal 66. It should be understood that FIG. 3A depicts signals 30a and 30b as ray traces for illustrative purposes only, and that signals 30a and 30b may propagate through material 14 as collimated beams.

Refractive materials 12 and 110 comprise optically transmissive materials, such as gradient index (GRIN) lenses. Refractive material 14 comprises a rhomboid, a prism, or any other suitable configuration of optically transmissive material having a first reflecting surface 116 and a second reflecting surface 118. Reflecting surfaces 116 and 118 may reflect optical signals 30a and 30b by total internal reflection or by reflective material. A refractive material 16, such as air or an epoxy layer, may be dispersed between material 14, and materials 12 and/or 110.

Switchplate 112 comprises any suitable refractive material having a contact surface 120 and a reflective surface 122. Switchplate 112 may be formed in many configurations without deviating from the inventive concepts of the present invention. Although the following description of the present invention is detailed with reference to switchplate 112 coupled to material 14 in proximal contact with second reflecting surface 118, it should be understood that switchplate 112 may also couple to material 14 in proximal contact with first reflecting surface 116 to accomplish the appropriate switching functions of the present invention. Reflective surface 122 of switchplate 112 is at a bias angle 124 with respect to contact surface 120 to direct optical signals 30a and 30b. The reflectivity of surface 122 may be caused by total internal reflection or by reflective material. Reflective surface 122 of switchplate 112 may also be non-reflective or optically absorbing.

Switchplate 112 has a first position spaced apart from refractive material 14 and a second position in proximal contact with refractive material 14 to frustrate the total internal reflection of optical signals 30a and 30b. The term proximal contact refers not only to direct contact between switchplate 112 and refractive material 14, but also contemplates any spacing or partial contact between switchplate 112 and refractive material 14 to frustrate the total internal reflection of signals 30a and 30b to a desired degree. In one embodiment, the spacing between switchplate 112 and refractive material 14 may be controlled to perform a variable signal splitter or attenuator function.

Actuator 114 comprises a piezoelectric device, a bimorph transducer, or any other suitable material that displaces switchplate 112 in response to an electrical, thermal, or other appropriate control signal 66. Activating and deactivating actuator 114 coupled to switchplate 112 causes actuator 114 to bring switchplate 112 into and out of proximal contact with refractive material 14. U.S. Pat. No. 5,555,327 and U.S. patent application Ser. No. 08/923,953 disclose a variety of techniques and components to construct switchplate 112, actuator 114, and combinations thereof that may be used with apparatus 100, and are herein incorporated by reference.

In operation, optical switch 102 receives primary optical signal 30a and protection optical signal 30b. As described above with reference to FIG. 1, a portion of signals 30a and 30b reflect off the interface between materials 12 and 14, and propagate back toward first face 20 as reflection signals 32a and 32b, respectively. The remaining portions of optical signals 30a and 30b propagate through the interface between materials 12 and 14 at an angle according to Snell's law. Reflection signals 32a and 32b generated at the interface between materials 12 and 14 may comprise Fresnel reflections modeled by the Fresnel equations described above with reference to FIG. 1.

Detectors 50a and 50b of signal monitoring circuit 28 receive and convert reflection signals 32a and 32b into monitoring signals 60a and 60b, respectively. In one embodiment, monitoring signals 60a and 60b contain in an electrical format the data communicated by reflection signals 32a and 32b, respectively. Since the data communicated by signals 32a and 32b comprises the data communicated by signals 30a and 30b, respectively, signals 60a and 60b contain the data communicated by signals 30a and 30b, respectively. Threshold circuits 62a and 62b coupled to optical detectors 50a and 50b receive and compare signals 60a and 60b with pre-determined threshold ranges to determine whether optical signals 30a and 30b are absent, attenuated, or otherwise degraded.

If threshold circuit 62a determines that primary signal 30a is present and suitable for use with optical switch 102, control circuit 64 may or may not generate a control signal 66 depending upon the position of switchplate 112. For example, if switchplate 112 is out of proximal contact with material 14, control circuit 58 may not generate control signal 66 so that optical switch 102 communicates primary signal 30a as output signal 104. If switchplate 112 is in proximal contact with material 14, control circuit 58 may generate control signal 66 that instructs actuator 114 to displace switchplate 112 out of proximal contact with material 14. Signals 30a and 30b propagate from refractive material 12 to refractive material 14 according to Snell's law. First reflecting surface 116 of refractive material 14 reflects signals 30a and 30b toward second reflecting surface 118. With switchplate 112 out of proximal contact with material 14, second reflecting surface 118 reflects signals 30a and 30b such that primary signal 30a propagates from refractive material 14 to refractive material 110 and exits refractive material 110 at output location 130 as output signal 104.

If threshold circuit 62a determines that primary optical signal 30a is absent, attenuated, or otherwise degraded, and threshold circuit 62b determines that protection signal 30b is present and suitable for use with optical switch 102, control circuit 50a generates control signal 66 that instructs actuator 114 to place switchplate 112 in proximal contact with second reflecting surface 118 of refractive material 14. First reflecting surface 116 of material 14 reflects signals 30a and 30b toward second reflecting surface 118. Switchplate 112 placed in proximal contact with material 14 frustrates the total internal reflection of signals 30a and 30b such that protection signal 30b propagates from refractive material 14 to refractive material 110 and exits refractive material 110 at output location 130 as output signal 104.

If threshold circuit 62a determines that primary signal 30a is absent, attenuated, or otherwise degraded, and threshold circuit 62b determines that protection signal 30b is also absent, attenuated, or otherwise degraded, control circuit 64 determines which of signals 30a or 30b is least degraded and generates control signal 66 that instructs optical switch 102 to communicate the selected signal 30 as output signal 104. In particular, if control circuit 64 determines that signal 30a is least degraded, then control circuit 64 may generate control signal 66 that instructs actuator 114 to displace switchplate 112 out of proximal contact with material 14, as described above, such that primary signal 30a exits at output location 130 as output signal 104. If control circuit 64 determines that protection signal 30b is least degraded, then control circuit 64 generates control signal 66 that instructs actuator 114 to place switchplate 112 in proximal contact with second reflecting surface 118 of material 14 to frustrate the total internal reflection of signals 30a and 30b such that protection signal 30b exits at output location 130 as output signal 104.

FIG. 3B illustrates a view of first face 20 of refractive material 12 taken along line 3B—3B of FIG. 3A. FIG. 3B depicts one possible configuration of signals 30 and 32 of FIG. 3A. Material 12 may include any number and arrangement of signals 30 and 32 to perform the switching functions of apparatus 100.

In one embodiment, fibers 24 and 26 may be mounted to material 12 in a suitable arrangement to communicate signals 30 and 32 between switch 102 and circuit 28. U.S. patent application Ser. Nos. 09/111,455, 09/111,570, and 09/111,571 disclose a variety of techniques for aligning and connecting optical fibers that may be used with apparatus 100, and are herein incorporated by reference.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for determining the condition of an optical signal, comprising:
    a first refractive material that receives an optical signal, the first refractive material having an interface with a second refractive material; and
    a signal monitoring circuit operable to determine the condition of the optical signal in response to a reflection of the optical signal at the interface, wherein the signal monitoring circuit indicates the attenuation of the optical signal in the second refractive material if the magnitude of the reflection exceeds a threshold.

2. The system of claim 1, wherein the reflection comprises a Fresnel reflection.

3. The system of claim 1, wherein the signal monitoring circuit indicates the absence of the optical signal if the magnitude of the reflection is less than a threshold.

4. The system of claim 1, wherein the first refractive material receives a second optical signal and the signal monitoring circuit is further operable to determine the condition of the second optical signal in response to a reflection of the second optical signal at the interface.

5. The system of claim 1, wherein the signal monitoring circuit is further operable to generate a control signal in response to the reflection, and further comprising an optical switch operable to couple a selected one of the optical signal or a protection signal with an output in response to the control signal.

6. The system of claim 1, wherein the signal monitoring circuit is further operable to determine a portion of the data communicated by the optical signal using the reflection.

7. The system of claim 1, further comprising an optical switch operable to couple a selected one of the optical signal or a protection signal with an output in less than approximately ten microseconds after the signal monitoring circuit determines the condition of the optical signal.

8. A method for determining the condition of an optical signal, comprising:
    communicating an optical signal through a first refractive material having an interface with a second refractive material;
    detecting a reflection of the optical signal at the interface; and
    determining that the optical signal is attenuated in the second refractive material if the magnitude of the reflection exceeds a threshold.

9. The method of claim 8, wherein the reflection comprises a Fresnel reflection.

10. The method of claim 8, further comprising determining the absence of the optical signal if the magnitude of the reflection is less than a threshold.

11. The method of claim 8, further comprising determining a portion of the data communicated by the optical signal in response to the reflection.

12. The method of claim 8, further comprising:
    generating a control signal in response to the reflection; and
    coupling a selected one of the optical signal or a protection signal with an output in response to the control signal.

13. The method of claim 12, wherein coupling a selected one of the optical signal or the protection signal comprises placing a switchplate to frustrate the total internal reflection of the protection signal such that it couples with the output.

14. The method of claim 8, further comprising coupling a selected one of the optical signal or a protection signal with an output in less than approximately ten microseconds after determining the condition of the optical signal.

15. An optical switch, comprising:
a first refractive material that receives a first optical signal and a second optical signal, the first refractive material having an interface with a second refractive material;
a signal monitoring circuit operable to generate a control signal in response to a reflection of the first optical signal at the interface;
a switchplate having a first position and a second position; and
an actuator coupled to the switchplate and operable to place the switchplate in a selected one of the first position and the second position in response to the control signal.

16. The optical switch of claim 15, wherein:
the second refractive material reflects the first optical signal such that it couples with an output if the switchplate is placed in the first position; and
the switchplate placed in the second position frustrates the total internal reflection of the second optical signal such that it couples with the output.

17. The optical switch of claim 15, wherein the signal monitoring circuit comprises:
a transducer that converts the reflection into an electrical signal;
a threshold circuit that compares the electrical signal with a threshold; and
a control circuit that generates the control signal in response to the threshold circuit.

18. The optical switch of claim 17, wherein the signal monitoring circuit further comprises:
a second transducer that converts the reflection of the second optical signal at the interface into a second electrical signal; and
a second threshold circuit that compares the second electrical signal with the threshold;
wherein the control circuit generates the control signal in response to the first threshold circuit and the second threshold circuit.

19. A system for determining data communicated by an optical signal, comprising:
a first refractive material that receives an optical signal, the first refractive material having an interface with a second refractive material; and
a signal monitoring circuit operable to determine the content of the optical signal using a portion of the optical signal reflected at the interface.

20. The system of claim 19, wherein the reflected portion of the optical signal comprises a Fresnel reflection.

21. The system of claim 19, wherein the signal monitoring circuit indicates the absence of the optical signal if the magnitude of the reflected portion is less than a threshold.

22. The system of claim 19, wherein the signal monitoring circuit indicates the attenuation of the optical signal in the second refractive material if the magnitude of the reflected portion exceeds a threshold.

23. The system of claim 19, wherein the first refractive material receives a second optical signal and the signal monitoring circuit is further operable to determine the content of the second optical signal in response to a portion of the second optical signal reflected at the interface.

24. The system of claim 19, wherein the signal monitoring circuit is further operable to generate a control signal in response to the content determined by the signal monitoring circuit, and further comprising an optical switch that operates in response to the control signal.

25. A method for determining data communicated by an optical signal, comprising:
communicating an optical signal through a first refractive material having an interface with a second refractive material;
detecting a reflected portion of the optical signal at the interface; and
determining the content of the optical signal using the reflected portion of the optical signal.

26. The method of claim 25, wherein the reflected portion comprises a Fresnel reflection.

27. The method of claim 25, further comprising determining the absence of the optical signal if the magnitude of the reflected portion is less than a threshold.

28. The method of claim 25, further comprising determining the attenuation of the optical signal in the second refractive material if the magnitude of the reflected portion exceeds a threshold.

29. The method of claim 25, further comprising:
generating a control signal in response to the determined content; and
operating an optical switch in response to the control signal.

30. A system for determining the condition of an optical signal, comprising:
a first refractive material that receives an optical signal, the first refractive material having an interface with a second refractive material;
a signal monitoring circuit operable to generate a control signal in response to a reflection of the optical signal at the interface; and
an optical switch operable to couple a selected one of the optical signal or a protection signal with an output in response to the control signal.

31. The system of claim 30, wherein the reflection comprises a Fresnel reflection.

32. The system of claim 30, wherein the signal monitoring circuit indicates the absence of the optical signal if the magnitude of the reflection is less than a threshold.

33. The system of claim 30, wherein the signal monitoring circuit indicates the attenuation of the optical signal in the second refractive material if the magnitude of the reflection exceeds a threshold.

34. The system of claim 30, wherein the first refractive material receives a second optical signal and the signal monitoring circuit is further operable to determine the condition of the second optical signal in response to a reflection of the second optical signal at the interface.

35. The system of claim 30, wherein the signal monitoring circuit is further operable to determine a portion of the data communicated by the optical signal using the reflection.

36. A method for processing an optical signal, comprising:
communicating an optical signal through a first refractive material having an interface with a second refractive material;
detecting a reflection of the optical signal at the interface;
generating a control signal in response to the reflection; and
coupling a selected one of the optical signal or a protection signal with an output in response to the control signal.

37. The method of claim 36, wherein the reflection comprises a Fresnel reflection.

38. The method of claim 36, further comprising determining the absence of the optical signal if the magnitude of the reflection is less than a threshold.

39. The method of claim 36, further comprising determining that the optical signal is attenuated in the second refractive material if the magnitude of the reflection exceeds a threshold.

40. The method of claim 36, further comprising determining a portion of the data communicated by the optical signal in response to the reflection.

41. The method of claim 36, wherein coupling a selected one of the optical signal or the protection signal comprises placing a switchplate to frustrate the total internal reflection of the protection signal such that it couples with the output.

* * * * *